Feb. 29, 1944.   A. CORTE ET AL   2,342,843
GUNSIGHT INTERPUPILLARY ADJUSTMENT
Filed Dec. 27, 1941
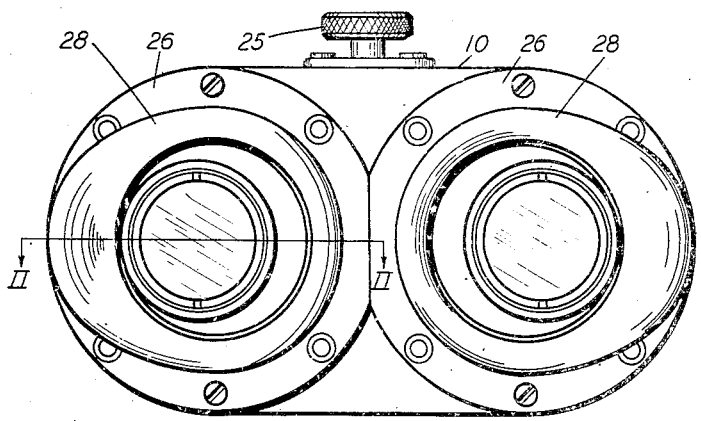
FIG—I
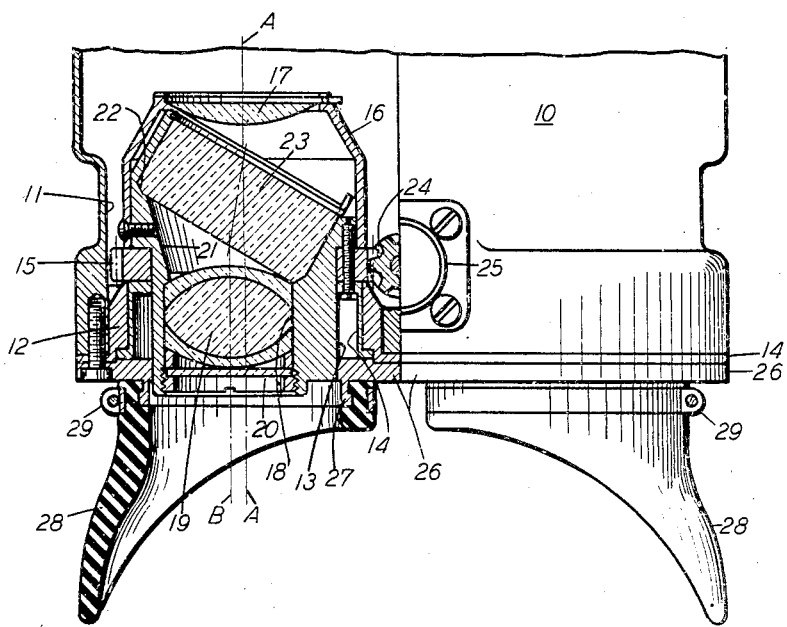
FIG—II
INVENTORS
ALFRED CORTE &
LEWIS B. BROWDER
BY George C. Sullivan Patented Feb. 29, 1944

2,342,843

UNITED STATES PATENT OFFICE 2,342,843

GUN-SIGHT INTERPUPILLARY ADJUSTMENT

Alfred Corte, Glendale, and Lewis B. Browder, Burbank, Calif., assignors, by mesne assignments, to Lockheed Aircraft Corporation, a corporation of California Application December 27, 1941, Serial No. 424,640

7 Claims. (Cl. 88—34)

This invention relates to an improved and simplified arrangement for providing interpupillary adjustments in binocular optical instruments of which microscopes, range finders, and optical gunsights are examples. Such adjustments are necessary to accommodate the variations in the eye spacing of different individuals.

It has heretofore been suggested to provide such interpupillary adjustments by means of relative sidewise or bodily shift of the two optical systems, by means of translation of the ocular axis through the use of a rhomboid shaped prism and rotation of the prism and the ocular about the original axis, or by the use of optical wedges in connection with rotatable and translatable oculars. An example of the latter system is disclosed in the Erfle Patent No. 1,497,294 of June 10, 1924, wherein a pair of optical wedges ahead of the ocular lens system, is intended to eliminate the cross-eyed effect of a single wedge. With such a system only a portion of the entire bundle or cone of light rays is utilized at any given setting of the interpupillary adjustment so that there must be some sacrifice in the size of the exit pupil. Such wedge systems also introduce distortion and astigmatism in the lens system, which vary in magnitude with the adjustment of the oculars.

It is accordingly an object of this invention to provide an improved and simplified interpupillary adjustment, wherein the entire bundle of rays is deviated by use of a thick, inclined, glass plate, so that on emergence from the plate they proceed in the same direction as before, but slightly displaced laterally. Inasmuch as the entire bundle of rays is led into the ocular, there need be no sacrifice in the size of the exit pupil. This is particularly important in a gun sight where the eye cannot be held in accurate alignment with the optical axis, but because of the excessive vibration, is liable to depart considerably therefrom, so that a large exit pupil is desirable in order that the complete field can be seen at all times.

It is a further object of this invention to provide an improved and simplified binocular eyepiece for telescopes, range finders, gunsights and the like, wherein a pair of ocular lens systems are eccentrically adjustable about fixed centers in a housing having eye cups and means for simultaneous adjustment of the pair of oculars in such a way as to vary the interpupillary distance while maintaining parallelism of the respective axes of the oculars and the axes about which they turn.

It is also an object of this invention to provide an improved and simplified binocular interpupillary adjustment readily set to the operator's eye spacing and providing oculars with interchangeable and self contained lens systems.

Other and further important objects of this invention will be apparent from the disclosures in the specification and the accompanying drawing.

This invention in its preferred form is illustrated in the drawing and hereinafter more fully described.

In the drawing—

Figure I is an elevation of an ocular system usable with various types of binocular optical instruments.

Figure II is a plan view thereof half broken away in a central horizontal section corresponding to the line II—II in Figure I.

The eye piece end of a binocular optical instrument is shown in the figures, being adaptable for use with a wide variety of telescopes and range finders, as well as the gunsight of the prior application of applicant, Alfred Corte, Serial No. 335,482, filed May 16, 1940, for which the present invention was developed. In the case of a telescope, range finder or gunsight, a casing 10 would be extended to embrace or connect with the balance of the optical system of the instrument, although as shown, only that portion thereof immediately associated with the operator's head position is given in the drawing.

The casing 10 may conveniently be formed as an oblong section with semicircular ends, the axes thereof being spaced to correspond with the desired mean interpupillary distance. The front face of the casing may conveniently be formed with a pair of spaced cylindrical bores 11, one of which is shown in section in Figure II, the axis thereof being designated by the letter A for convenience.

A flanged sleeve 12 is mounted within the bore 11 and serves as a guide and bearing for a rotatable shell 13 spaced therefrom by a Z section sleeve 14 rotatable with the shell 13 and serving to clamp a helical ring gear 15 thereagainst. A cap 16, carrying a field lens 17, is applied over the inner end of the shell 13. The parts 13 to 17 rotate as a unit about the axis A.

The shell 13 is bored eccentrically at 18 having an axis B offset slightly to the axis A but parallel thereto; the bore 18 being arranged to receive an eye lens 19 and cover glass 20, while a tapered rearwardly enlarged continuation 21 of the bore 18 is provided with a seat 22 for an optical flat 23. The angle of mounting and the thickness of the optical flat are so chosen that the ocular axis B will be refracted into coincidence with the housing axis A so that rotation of the shell 13 and the eccentrically mounted eye lens carried thereby will not affect the transmission of the entire bundle of light rays from the field lens 17 to the eye lens.

The helical ring gears 15 of the two shells 13 are simultaneously engaged by a helical pinion 24, centrally disposed therebetween, the pinion being operated by an external knurled head 25. This arrangement provides equal and opposite rotation of the twin shells 13 and results in simultaneous inward or outward movement of the axes B for variation of the interpupillary distance.

The sleeve 12 is clamped against the open end of the casing 10 by a collar 26 held by suitable screws or the like, the collar holding the outer flange of the sleeve 14 in a channel in the sleeve 12, while permitting rotation thereof. The collar 26 also carries a mounting flange 27 about which is clamped the base of an eye guard or cup 28 which is preferably of a soft or yieldable material of rubber-like characteristics to prevent injury to the operator when pressing his forehead thereagainst. Such a cushioning material allows the base thereof to be stretched over the flange 27 and to be retained in place by a clamping band 29. It will be noted that the eye cup or guard 28 and the collar 26 are stationary, and interpupillary adjustments result in rotation of the eccentrically mounted oculars within the fixed circles defined thereby.

The operation of the interpupillary adjustment of this invention involves slightly offsetting the entire bundle of light rays leaving the field lens while maintaining parallelism between the original and offset axes A and B. Consequently rotation of the shell 13 carrying the ocular lens does not vary or cut off any portion of the bundle of light rays, and the optical efficiency of the eye piece is not altered by such adjustments. The degree or amount of offset in each ocular need be only a quarter of the maximum range of interpupillary adjustment desired.

It will thus be seen that we have invented an improved and simplified interpupillary adjustment for binocular optical devices wherein the oculars rotate eccentrically relative to a fixed external structure and wherein the lateral displacement of the light rays is accomplished without change in their angular relationship with the axis of the optical device.

Having thus described our invention and the present preferred embodiments thereof, we desire to emphasize the fact that many modifications may be resorted to in a manner limited only by a just interpretation of the following claims.

We claim:

1. A binocular eyepiece comprising a pair of juxtaposed ocular lens systems, rotatable mounting means therefor so constructed and arranged as to rotate said ocular lens systems about fixed axes offset relative to the optical axes thereof, and angularly disposed optical flats carried by said mounting means and so constructed and arranged as to refract the offset optical axes of the oculars into the axes of rotation of the mounting means whereby rotation of the mounting means is adapted to vary the interpupillary distance between the oculars without loss of light transmission.

2. A binocular eyepiece comprising a pair of juxtaposed ocular lens systems, a rotatable mounting means supporting each lens system for rotation about a fixed axis offset relative to the optical axis thereof, adjusting means interconnected with each mounting means and operable to simultaneously rotate the two mounting means in opposite directions, and angularly disposed optical flats carried by said mounting means and arranged in front of the lens systems and positioned so as to refract the offset optical axes of the oculars into the axis of the mounting means whereby rotation of the mounting means is adapted to vary the interpupillary distance between the oculars without loss of light transmission.

3. A binocular eyepiece having provision for interpupillary adjustment, comprising a pair of aligned parallel ocular mounts, means for rotating said mounts in unison, ocular lens systems eccentrically mounted in said mounts in parallel relationship whereby the optical axis of each lens system is parallel to both the axes of the mounts and to each other and offset relative to the axes of the mounts, and optical flats angularly mounted in said ocular mounts and so constructed and arranged as to refractively displace the optical axes of said lens systems to coincide with the rotational axes of their respective mounts, whereby rotation of the mounts will vary the interpupillary distance without encroaching on the field of light rays.

4. A binocular eyepiece having provision for interpupillary adjustment, comprising a pair of aligned parallel ocular mounts, means for simultaneously adjusting the angular positions of said ocular mounts so constructed and arranged as to produce simultaneous and opposite movement thereof, ocular lens systems eccentrically mounted in said mounts in parallel relationship whereby the optical axis of each lens system is parallel to both the axes of the mounts and to each other and offset relative to the axes of the mounts, and optical flats angularly mounted in said ocular mounts and so constructed and arranged as to refractively displace the optical axes of said lens systems to coincide with the rotational axes of their respective mounts, whereby rotation of the mounts will vary the interpupillary distance without encroaching on the field of light rays.

5. A binocular eyepiece comprising a casing having chambers to receive parallel ocular mounts aligned with the average interpupillary spacing, rotatable ocular mounts in said chambers, eye lenses carried by said mounts in offset parallel relationship to the axes of rotation thereof, field lenses carried by said ocular mounts in alignment with the axes thereof, and an angularly disposed optical flat carried by each of said mounts between the eye lens and the field lens and so constructed and arranged as to refract the axis of the light rays from the field lens to the offset axis of the eye lens system.

6. A binocular eyepiece comprising a casing having chambers to receive parallel ocular mounts aligned with the average interpupillary spacing, rotatable ocular mounts in said chambers, stationary collars associated with the casing and adapted to retain said rotary mounts in said chambers, flexible stationary eye guards mounted on said collars, eye lenses carried by said mounts in offset parallel relationship to the axes of rotation thereof, field lenses carried by said ocular mounts in alignment with the axes thereof, and an angularly disposed optical flat carried by each of said mounts between the eye lens and the field lens and so constructed and arranged as to refract the axis of the light rays from the field lens to the offset axis of the eye lens.

7. A binocular optical instrument including a supporting structure, a pair of mounts carried by said structure for rotation about spaced parallel axes, a field lens on each mount having its optical axis coincident with the axis of rotation of its respective mount, an ocular lens system carried by each mount and having its optical axis parallel to and offset from the axis of rotation of its respective mount, an angularly disposed optical flat in each mount between its field lens and ocular lens system operable to refractively displace the incoming light from the axis of the field lens to the optical axis of the ocular lens system, and means for rotating the mounts so that the interpupillary distance may be varied at will.

ALFRED CORTE.
LEWIS B. BROWDER.